United States Patent [19]
Weber et al.

[11] Patent Number: 5,893,110
[45] Date of Patent: Apr. 6, 1999

[54] BROWSER DRIVEN USER INTERFACE TO A MEDIA ASSET DATABASE

[75] Inventors: Karon A. Weber, San Francisco; Alex D. Poon, Mountain View, both of Calif.; Christopher V. Malley, Boulder, Colo.

[73] Assignee: Silicon Graphics, Inc., Mountain View, Calif.

[21] Appl. No.: 698,649

[22] Filed: Aug. 16, 1996

[51] Int. Cl.$^6$ .................................................. G06F 17/30
[52] U.S. Cl. .......................... 707/104; 707/100; 707/3; 707/5; 707/1
[58] Field of Search ............................. 707/104, 5, 100, 707/3, 1

[56] References Cited

U.S. PATENT DOCUMENTS

| | | | |
|---|---|---|---|
| 5,241,671 | 8/1993 | Reed et al. ............................ | 707/104 |
| 5,404,316 | 4/1995 | Klingler et al. ....................... | 345/328 |
| 5,428,774 | 6/1995 | Takahashi et al. ..................... | 707/101 |
| 5,481,752 | 1/1996 | Suzuki et al. ......................... | 707/530 |
| 5,517,605 | 5/1996 | Wolf ..................................... | 707/104 |
| 5,553,281 | 9/1996 | Brown et al. .......................... | 707/104 |
| 5,574,911 | 11/1996 | D'Angelo et al. ..................... | 707/1 |
| 5,600,831 | 2/1997 | Levy et al. ............................ | 707/2 |
| 5,671,404 | 9/1997 | Lizee et al. ........................... | 707/5 |
| 5,802,492 | 9/1998 | DeLorme et al. ..................... | 701/200 |

OTHER PUBLICATIONS

Author unknown, QBIC IBM's Query By Image Content, http://wwwqbic.almaden.ibm.com, Dec. 1993.
Telektronikk, Mar Davis, Media Streams: An Iconic Visual Language for Video Annotation, pp. 59–71, vol. 89 No. 4, Dec. 1993.
Telektronikk, Marc Davis, Media Streams: an iconic visual language for video annotation, pp. 59–71, vol. 89 No. 4 (1993).

*Primary Examiner*—Thomas G. Black
*Assistant Examiner*—Greta L. Robinson
*Attorney, Agent, or Firm*—Sterne, Kessler, Goldstein & Fox P.L.L.C.

[57] ABSTRACT

A method for automatically constructing a database query for data assets associated with multimedia works. The database query is based on the context of a selected point of interest of a multimedia work. The point of interest is selected by a user interacting with the multimedia work and pausing the multimedia work at the point of interest. A database query is automatically constructed that is constrained by data that is associated with the point of interest. In addition, a list of attributes of the data that is associated with the point of interest is displayed to the user before the search is performed. The user has the option to further constrain the database search by selecting one or more attributes from the list of attributes. The user may also constrain the database search by adding keywords to a keyword entry field.

21 Claims, 4 Drawing Sheets

BROWSER DRIVEN USER INTERFACE TO A MEDIA ASSET DATABASE

BACKGROUND OF THE INVENTION

1. Field of the Invention

The present invention relates generally to multimedia production studios and more particularly to a method for constructing a database query from an intuitive browser driven user interface to a database system containing diverse multimedia data assets.

2. Related Art

The production of multimedia works is a complicated, expensive and time consuming process that can involve huge production teams, enormous budgets, and resources of entire production studios. As used herein, the term multimedia works can include all types of films including animated films, videos and conventional analog films. Such films may include the use of animation and/or computer generated graphics. Further, multimedia works can include interactive movies, video games and other entertainment and educational type of content that run on personal computer systems, dedicated game consoles, kiosk machines and the like. It is becoming more common that the production of multimedia projects consume monetary budgets and other resources that have traditionally been associated only with the production of major Hollywood feature films.

Large production teams can consist of hundreds of people working together on a single multimedia project. Many different computerized tools are typically used to create, edit, and otherwise manipulate the diverse multimedia data which typically comprises a variety of heterogeneous formats and structures. Even during the production of conventional analog films, computerized tools may be used early on in the development process to model the film, for example. Thus, production studios must manage, store and track the vast amounts of multimedia data during the production process. It is desirable that such data be readily available to all members of the production team in a fast and efficient manner.

Multimedia data, as the term is used herein, includes any and all types of data that is useful during the production of a multimedia work. This not only includes data that is ultimately a part of the multimedia end product, but data that is used during the creation process, such as early prototypes and inspirational art. For example, early prototypes may be in the form of sketches, models, storyboards, workbooks or the like. Inspirational art is used during the creation process, but is generally not included in the end product. For example, during the process of creating a video game of an automobile race, it may be useful to view actual film footage of the Indianapolis 500. If such a film clip is used in this manner it is typically stored in the production studio's database so that it can be viewed by the author and shared among the members of the production team.

Further, each instance of multimedia data does not necessarily comprise multiple data components or different types of media. Multimedia data can comprise data of a single media type. For example, a TIFF data file is an industry standard for a compressed data format that comprises a single still video image. Thus, even though a TIFF file comprises a single media type, it is considered to be multimedia data because it can be used during the production process of a multimedia production. Likewise, an MPEG data file, which is an industry standard for a compressed data format that comprises full-motion video as well as audio data components, is another example of multimedia data.

Typically, it is very difficult to find particular multimedia data elements (hereinafter referred to generally as 'data assets') that are stored in the vast storage facilities of a production studio. This is particularly true due to the sheer number of data assets that are managed by a production studio and the nature of the data assets themselves. Such data assets typically provide little evidence as to their contents. Conventionally, in order to find particular multimedia data assets, users are required to browse through a file management system or perform computer database searches based on a database query.

Browsing files within a file management system generally entails using a file browser that allows the user to traverse nodes in a file system hierarchy. Generally, the user is provided with very little information about the data assets. Such information includes for example, a file name, which may not be at all descriptive of its contents, creation and/or modification date(s) and possibly a brief description.

Formulating computer database queries may be equally if not more cumbersome. Such queries typically involve filling out electronic forms by specifying specific values assigned to pre-defined attributes. After the database query is constructed, a database application program searches and retrieves a list of assets that match the specific query. This process may be difficult, especially for studio personal who are not generally versed in computer database technologies. In addition, it is very difficult to retrieve data in this fashion because users must often supply non-intuitive details about the data asset, such as a frame and/or a sequence numbers, file names, key words and the like. Such details may no longer be remembered by a user or may be unknown because the user is someone other than the creator of the database asset.

What is needed, therefore is an improved method for finding and accessing multimedia data assets in a production studio environment.

SUMMARY OF THE INVENTION

Accordingly, the present invention is directed toward a multimedia database GUI that fits naturally and seamlessly into the viewing and browsing environment of a multimedia production studio. The present invention assists users of all types, including artists, computer programmers, production managers, editors, directors, and producers in finding multimedia data that is created and/or used during the production process. In addition, the present invention facilitates re-using multimedia data assets from previous productions by making such assets easily retrievable.

The present invention provides an integrated tool for browsing time-based multimedia sequences such as movies, videos, interactive video games and the like, and provides a means to view and/or edit the multimedia data components that comprise the media being viewed. For example, while a user is viewing a movie, the user can generate a database query at any time by stopping at a particular movie frame that is of interest. Similarly, while a user is playing an interactive video game, the user can request a database query at any time by pausing the video game at a particular point of interest. However, the present invention does not require a user to supply specific values for database attributes as in the conventional method. Instead, the present invention automatically generates database queries that are constrained by the context of the material being viewed.

Thus, the present invention provides an automatic query by example. Accordingly, when a user freezes a time-based sequence, which includes audio and visual components, the present invention provides the user with a means to access any or all of the components that comprise the content being viewed. In addition, the present invention provides information to the user as to what types of components are available for the current content being viewed. This allows the user to further constrain the database search, by specifying the types of components that are of interest.

BRIEF DESCRIPTION OF THE FIGURES

The present invention will be described with reference to the accompanying drawings, wherein.

In the drawings, like reference numbers generally indicate identical, functionally similar, and/or structurally similar elements. The drawing in which an element first appears is indicated by the leftmost digit(s) in the reference number.

DETAILED DESCRIPTION OF THE PREFERRED EMBODIMENTS

The present invention is directed towards a browser driven user interface to a database that automatically constructs database queries for finding data assets associated with multimedia works. The database query is based on the context of a selected point of interest of a multimedia work. The point of interest is selected by a user interacting with the multimedia work and pausing the multimedia work at the point of interest. A database query is automatically constructed that is constrained by data that is associated with the point of interest. In addition, the present invention provides additional means to constrain the database search, by providing a list of attributes of the data that is associated with the point of interest before the search is performed. Thus, the user has an option to further constrain the database search by selecting one or more attributes from the list of attributes. The user may also constrain the database search by adding keywords to a keyword entry field.

Figure 1:
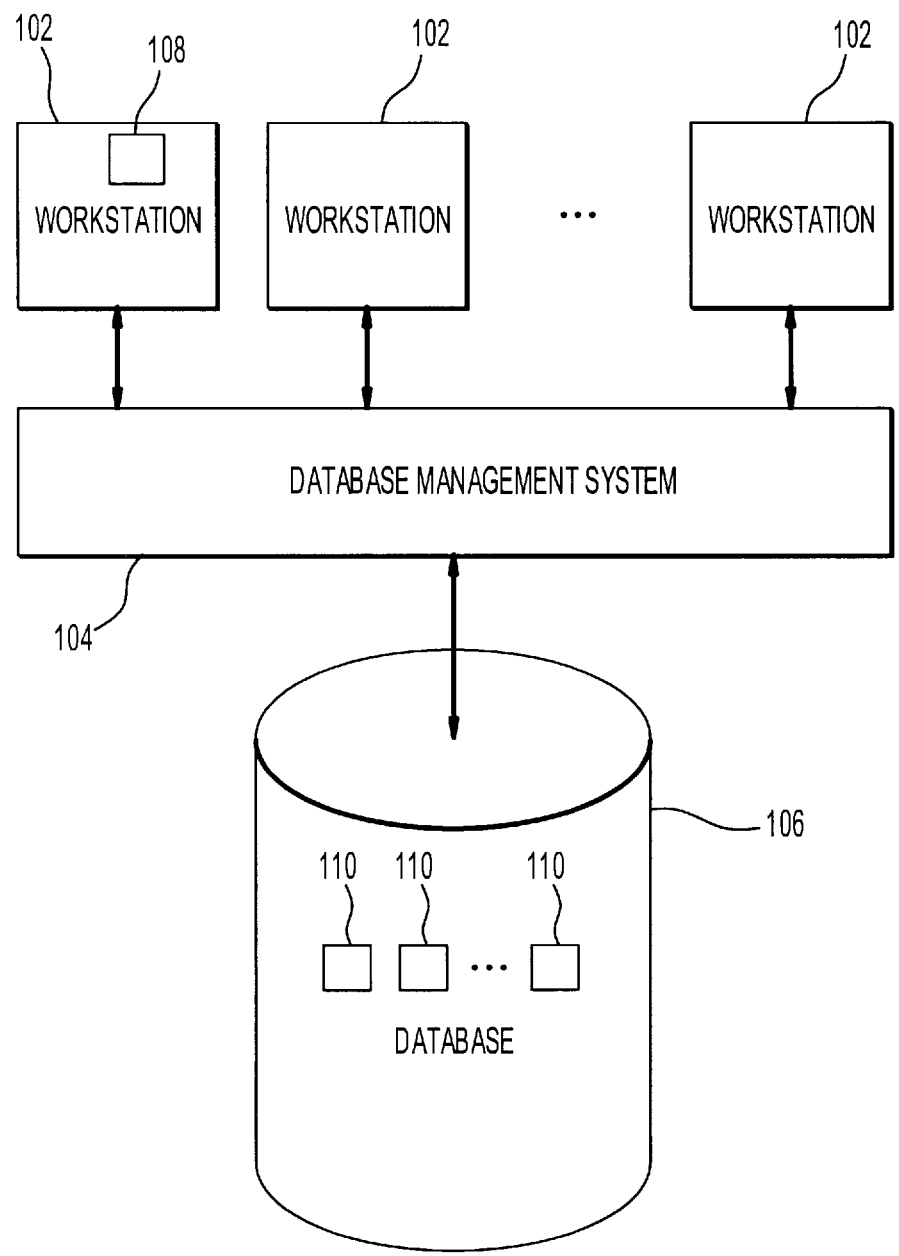
FIG. 1 is a block diagram which depicts a typical multimedia production studio environment in which the present invention operates.

FIG. 1 is a block diagram which depicts a typical multimedia production studio environment in which the present invention operates. A plurality of computer workstations 102 are coupled to a database management system 104. The database management system 104 is coupled with a database 106.

In one embodiment, the present invention is implemented as a computer program 108 that is executed on the computer workstation 102. In a typical environment, such as a film studio environment, the computer program 108 can be executed on one or more of the computer workstations 102. The computer program 108 is granted access to the plurality of multimedia data assets 110 that are stored in the database 106 via the database management system 104.

The database management system manages the storage, retrieval and categorization of a plurality of data assets 110, which are stored in the database 106. Such database management systems are well known and are typically used to 'check-in' and 'check-out' data assets 110 to and from the database 106. Typically, data assets 110 are created by one or more content creation tools (not shown). Once created, the data assets 110 are typically checked-in to the database 106, via the database management system 104. Alternatively, information pertaining to data assets are checked-in to the database 106, via the database management system. For example, information about a hand-drawn sketch, such as its contents and physical location may be stored in the database 106.

Examples of content creation tools that are typically used in a film studio environment include video film editors, painting programs, three-dimensional modeling utilities, animation tools, audio creation tools and the like. In addition, works that are created outside the production studio environment such as hand drawn sketches, hand drawn paintings, photographs and analog films, are digitized (i.e. converted into computer data files) so that they can be checked-in to the database 106 and used by the production staff.

Another important feature provided by the database management system 104 is to categorize the data that is stored in the database 106. This function is typically accomplished by having content owners provide information about data assets at check-in time. Such information includes, for example, the name of the creator or owner, the creation or check-in date, the type of data, the department which created the data, keywords and the like. Such information is typically used as criteria for database searches. Such information is hereinafter referred to as data asset attributes.

Figure 2:
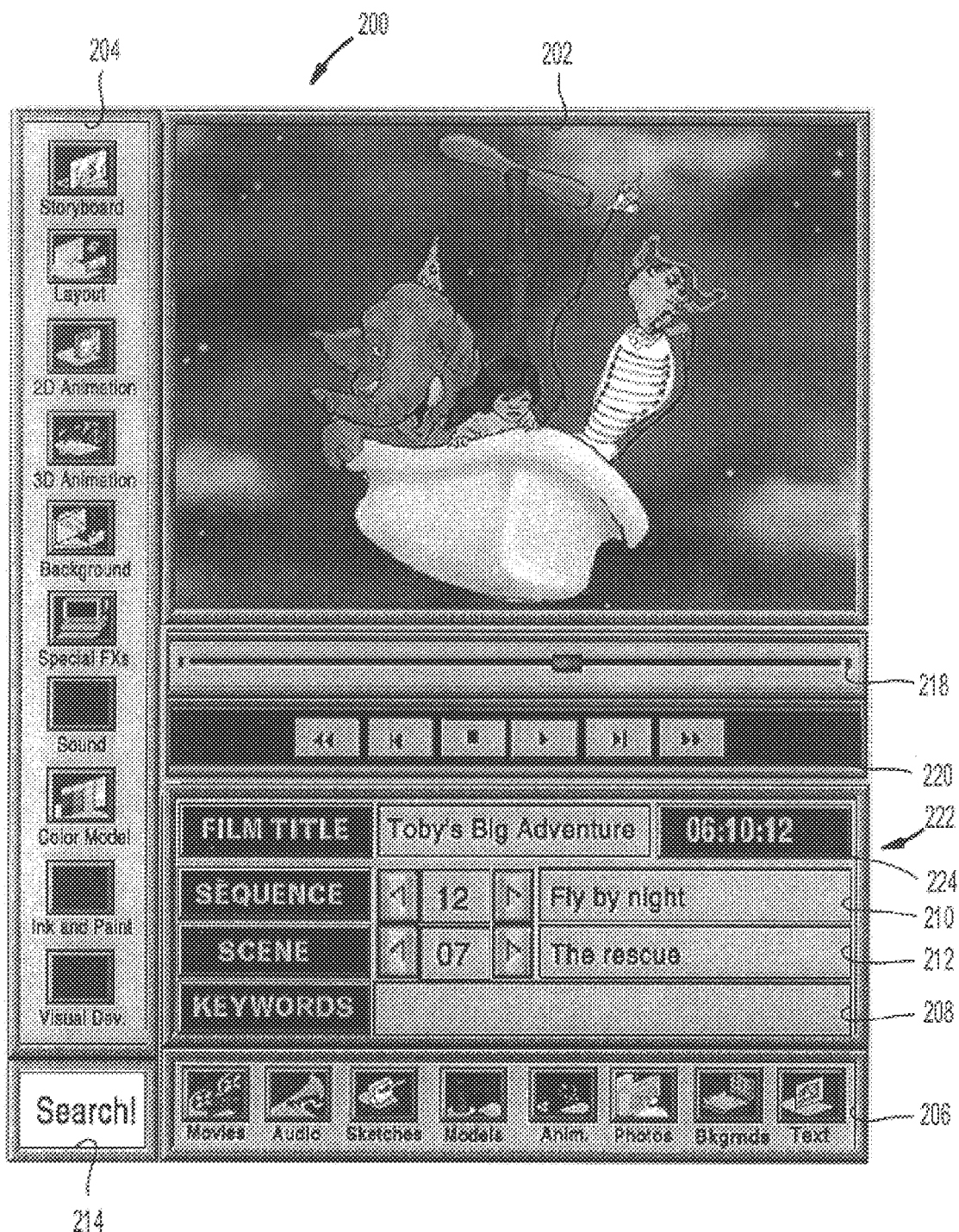
FIG. 2 is a diagram depicting a screen shot of a specific implementation of the present invention.

FIG. 2 is a diagram depicting a screen shot of a specific implementation of the present invention. In this example, the implementation of the present invention is used to find data assets associated with an animation film. Note that this is just one example of an implementation of the present invention. This example is presented in order to distinctly point out the principles discussed herein and should not be construed to limit the scope of the present invention. As previously discussed, the present invention can be used in any type of multimedia works environment.

The specific implementation of the present invention 200 will be referred to herein as the 'data asset browser', or more simply, the browser. The browser 200 comprises a movie playback window 202, a movie scroll bar 218, a movie control bar 220, a production department icon bar 204, a media asset types icon bar 206, a search button 214 and a status area 222. The status area 222 comprises a film title window 224, sequence window 210, a scene window 212 and a keywords entry field 208.

The movie playback window 202 is used to display the current film being viewed. In this example an animation film is presented so that a user can view the film in real time. In other embodiments of the present invention, other types of multimedia works will be displayed in the movie playback area 202. For example, during the production of an interactive video game, the video game under production will be displayed in the movie playback area 202.

Further, during a typical production process, the movie playback window 202 will not necessarily display the finished product. In a typical animation studio environment, for example, it is very useful to view what is referred to as a 'work-in-progress'. A work-in-progress is a time-based sequence that depicts the latest version of each portion of a multimedia work. This may include portions of the film that have not yet been developed or animated. For example, a work in progress may include segments of the work in storyboard format, ink and paint drawings and the like, while other segments can be in a final full color and full animation format. Still other segments may comprise only audio components or rough sketches and the like.

Still, as stated it is very useful to splice together the latest version of the work product as early as possible during the production process. The same is true for other types of multimedia works, including analog films and interactive video games. In the case of analog films, the use of animation, storyboards, sketches, 3D modeling, etc., are used early in the production process in order to prepare for the filming portion of the project. This type of early preparation and planning work is important due to the enormous expenses involved once the filming process begins.

Thus, the present invention can be used to view such works-in-progress as well as the finished product. In any case, as will be described below, the components that comprise the current version, as well as earlier versions of the work being viewed in the movie playback window 202 can be easily retrieved by an implementation of the present invention.

The movie that is being viewed in the movie playback window 202 is manipulated by the movie scroll bar 218 and the movie controls in the movie control bar 220. Typically, the user interacts with the movie being displayed in the movie playback window 202 by using the movie controls in the movie control bar 220. The movie controls in this example operate in a similar fashion to the controls most commonly found on video tape recorders (VCRs). Such controls include, as depicted from left to right in the movie control bar 220, rewind, reverse, stop, play, forward, and fast forward. The movie scroll bar 218 is used to position the movie forward or backward by dragging (with a mouse or similar pointing device) the movie scroll bar button (which is depicted above the play button in FIG. 2).

Note that in other embodiments of the present invention, other types of controls may be used so that a user can interact with the multimedia work that is displayed in the movie playback window 202. For example, in an interactive video game environment, a user may interact with the video game by using a mouse, joystick or keyboard in much the same fashion as a user will interact with the end product. In addition, other controls that allow the user to jump from one portion of the video game to another may be provided. In any case, the specific implementation of such controls will be apparent to those skilled in the relevant art(s). In addition, a pausing mechanism, such as the stop button depicted in the control bar 220 should be provided by implementations of the present invention.

The status area 222 comprises a film title window 224, a sequence window 210, a scene window 212 and a keyword entry field 208. The film title window 224 comprises the name of the film which is being displayed in the movie playback window 202; in this case 'Toby's Big Adventure'. In one embodiment of the present invention, the film title 222 may comprise a pull-down list (not shown), which selectively displays a list of films that are available in the database 106. This will allow a user to select a multimedia work by choosing one of the titles from the pull-down list in the film title window 224.

To the right of the title in the film title window 222 is a window that displays the current movie position in terms of time. In this case, the time '06:10:12' indicates that the current position is 6 minutes, 10 seconds and 12 tenths of second from the beginning of the film. Below the film title window 224 is the sequence window 210 which displays the name and number of the current sequence. Below the sequence window 210 is the scene window 212 which displays the name and number of the current scene. Note the arrows to the right and left of the sequence number '12' and the scene number '07', in the sequence and frame windows 210 and 212, respectively. This shows another example of a means to control the position of the multimedia works being displayed in the movie playback window 202. By clicking on the arrows a user can specify a particular sequence and/or scene number, thereby causing the movie position to change to the specified position.

The keyword entry field 208 provides a means for a user to enter a keyword. The keyword may be used to constrain the database search to those entries that contain the keyword, in one fashion or another. For example, a user may enter the keyword 'elephant' to limit the database search to those data assets that are related to the elephant displayed in the movie playback window 202. Accordingly, depending on the implementation of the present invention, the database search is constrained by the keyword entered in the entry field 208. For example, in one implementation the search is constrained by those data assets that contain the value of the keyword in a particular pre-defined attribute (such as the 'keyword' attribute). In another implementation the search is constrained by those data assets that include the keyword as a value in any or all of the attributes defined for that asset, such as the 'title', 'subject', 'keyword' and 'creator' attributes. In yet another implementation of the present invention, the user may customize the search by specifying one or more values for particular attribute(s), and possibly boolean logic. For example a user can specify in the keyword field 208 'Creator=Weber' and 'CreationYear>1994'. This will constrain the database search to data assets created by 'Weber' after the year 1994.

The two icon bars, namely the production departments icon bar 204 and the media asset types icon bar 206, serve a dual purpose. First the icon bars 204 and 206 provide the user with information about available data assets associated with the current portion of the multimedia work being displayed in the playback window 202. Accordingly, a highlighted icon indicates that at least one data asset of the corresponding type represented by the icon is available in the database 106. An un-highlighted icon indicates that no data assets of that type are available in the database 106. For example, the icons in the production department icon bar 204 with the titles 'Sound', 'Ink and Paint' and 'Visual Development' are un-highlighted, while all of the other icons in both icons bars 204 and 206 are highlighted.

In a preferred embodiment, the icon bars 204 and 206 are highlighted and un-highlighted in real-time. That is, upon some predefined periodic interval the icons continuously provide information to the user, as described above, while a work is being run. For example, upon each movie frame, the status of the icons 204 and 206, which represent available data assets, is updated while a user is viewing a movie. Similarly, upon each frame in an interactive video game, the icons 204 and 206 are updated while a user is playing the interactive game. In another embodiment, the icons 204 and 206 are updated only when the user pauses or stops the multimedia works. The real-time method is preferred because such implementation can better assist the user in finding data assets that are of interest. For example, if a user is only interested in one or more particular types of data assets, the user can stop or pause the multimedia works when such icons which represent the types of data assets of interest are highlighted.

The second function performed by the icons 204 and 206 is to provide a means for the user to further constrain the database query beyond the context of the movie playback window 202 (described below), and the keyword data entry 208. Thus, the icons 204 and 206 not only serve to provide information to the user about the available data assets, but allow the user to selectively constrain the database search. Accordingly, in one embodiment the user constrains the database search by selecting one or more of the highlighted icons 204 and 206. In a typical embodiment, the user selects one or more icons 204 and 206 by clicking on the icon with a pointing device such as a mouse.

Note that in this example, the icons 204 and 206 are broken down into two categories, namely the production department icon bar 204 and the media asset types icon bar 206. The choice of the icons and icon bars depends on the specific implementation of the present invention. In this case, an example of an animation studio environment is depicted. In an animation studio environment, many different departments are typically used to create the various portions of the multimedia data assets used during the production process. For example, referring to the production department icon bar 204, going from top to bottom, the following departments are included: Storyboard; Layout; 2D Animation; 3D Animation; Background; Special Effects; Sound; Color model; Ink and Paint; and Visual Development.

Accordingly, suppose a user is interested in finding out how the background, namely the clouds and stars depicted in the movie playback window 202, was produced. Thus, the user may select the background department to efficiently limit the database search. This may be convenient because the user may not know precisely what type of data asset comprises the background. As such, the user cannot intelligently select a media asset type icon 206 (described below) to further constrain the search. However, the user does know that the background of interest has been created by the background department and thus may intelligently limit the database search by selecting the background icon in the production department icon bar 204. In addition, personnel that work in certain departments may only be interested in data asset components that have originated in their particular department.

Referring to the media asset types icon bar 206, going left to right the following types are defined: Movies; Audio; Sketches; Models; Animation; Photographs; Background; and Text. Accordingly, suppose a user is interested in modifying the soundtrack that is associated with the current scene being viewed in the movie playback window 202. In this case, the user selects audio as the media asset types, which should yield the audio track of interest.

Note that as stated, the choice of icons 204 and 206 and the categories that they represent, depend on the specific implementation of the present invention. Specifically, they depend on the implementation of the database management system 104, as previously described. More particularly, the choice of icons depends on the attributes that are defined by the database management system 104. In this example, the database management system 104 should provide a means to define the production departments 204 and the media asset types 206. For example, upon checking in each data asset 110 into the database 106, the owner of the data asset defines at least one production department from the list of production departments 204, and at least one media asset type from the list of media asset types 206.

In another implementation of the present invention, it may make sense to define only one icon bar, or more than two icon bars. For example, in an interactive video game environment, it may make sense to organize the icon bars into the two icon bars, one representing the computer programming aspect of the product and the other representing the filming aspect of the product. The choice of organization of the icon bars, such as the production department icon bar 204 and the data asset type icon bar 206, depends on the specific implementation of the present invention. Such organization should be designed to facilitate the ease of use of the present invention. As stated, icons 204 and 206 represent the attributes that are defined by the database management system 104.

The search button 214 is used by the user to launch a database query. The database query is constrained by the context of the paused multimedia works in the movie playback window 202, the selected icons from icon bars 204 and 206, and the contents of the keyword entry field 208.

As stated the user pauses the multimedia work by selecting the stop button in the control window 220 at a point of interest. The present invention is used to create a database query that is based on the content of the particular point of interest of the multimedia works. For example, suppose a user selects the still animation frame depicted in the movie playback window 202 in FIG. 2. The still animation frame is the point of interest which is used by the present invention to construct a database query therefrom.

In this example, the subject of the database query is all of the components that are associated with the still frame image shown in the playback window 202. For example, the still frame comprises a plurality of individual data assets. In this example, suppose the blue sky and the cloud portion of the background comprise hand painted artwork. Thus, a search that is launched by selecting the background production department icon 204 and the model data asset type icon 206 would yield a result with information pertaining to the hand painted data assets that comprise the blue sky and the clouds.

The form in which the search results are provided to the user is beyond the scope of the instant disclosure. However, in order to describe the working environment in which the present invention operates, some examples are presented below. For example, a user will typically be presented with a list of data assets that are the results of the database query. The user may then select a data asset of interest. Once selected, additional information is provided to the user. For example, if the data asset is a hand painted work of art that has not been digitized, the location of the work of art is revealed to the user. If the data asset is in a computerized format, such as a digitized sound or image, or a work product from a content creation tool, an appropriate computer utility is launched so that the user can view the data asset on the display screen. Alternatively, the user may have the option to check-out the data asset if modification is desired.

Referring back to the still frame image depicted in movie playback window 202 in FIG. 2, recall that the blue sky and cloud portion of the background are comprised of hand painted art work. However, in this example, the star portion of the background is generated by computer graphics. Further, the three occupants of the bath tub are hand painted animation data assets, but the bathtub itself and its propeller comprise 3D textured surfaces over wire frame models. Additionally, the script of the animation sequence is a text type data asset.

Thus, as can be seen, many diverse types of data assets are associated with this particular point of interest. Accordingly, the appropriate icons 204 and 206 are highlighted to reflect the available data assets associated with the point of interest. This will assist the user in selecting the appropriate icons to narrow the database search, if desired.

In addition, other data assets that are not part of this latest version of the multimedia works as shown in the playback window 202 are also associated with the point of interest. Such examples include prototype art work, earlier versions of the point of interest and inspirational art work. For example, a movie data asset of an elephant charging may be part of the inspiration art work used to create the animation of the elephant associated with the point of interest. Similarly a photograph of a helicopter may be another type of inspiration art work associated with the point of interest.

Additionally, one or more audio data assets may be associated with the sequence pertaining to the point of interest. In this case, since an audio data asset cannot possibly be associated with a single animation frame, the browser 200 automatically associates the audio data assets with the sequence associated with the point of interest. Likewise, sketches such as storyboards and the like, may be associated with the sequence.

The level of granularity with which the browser associates a particular data asset to a particular point of interest is automatically selected. This may be accomplished by having the owner of the data asset specify the granularity of association at check-in time. In the preferred embodiment, data assets types are automatically associated with a particular granularity by data models within the database management system. For example, data asset types of audio are automatically assigned a point of interest granularity of sequence and data asset types of text are associated with a point of interest granularity of scene. Such data models that are used with database management systems are well known.

Figure 3:
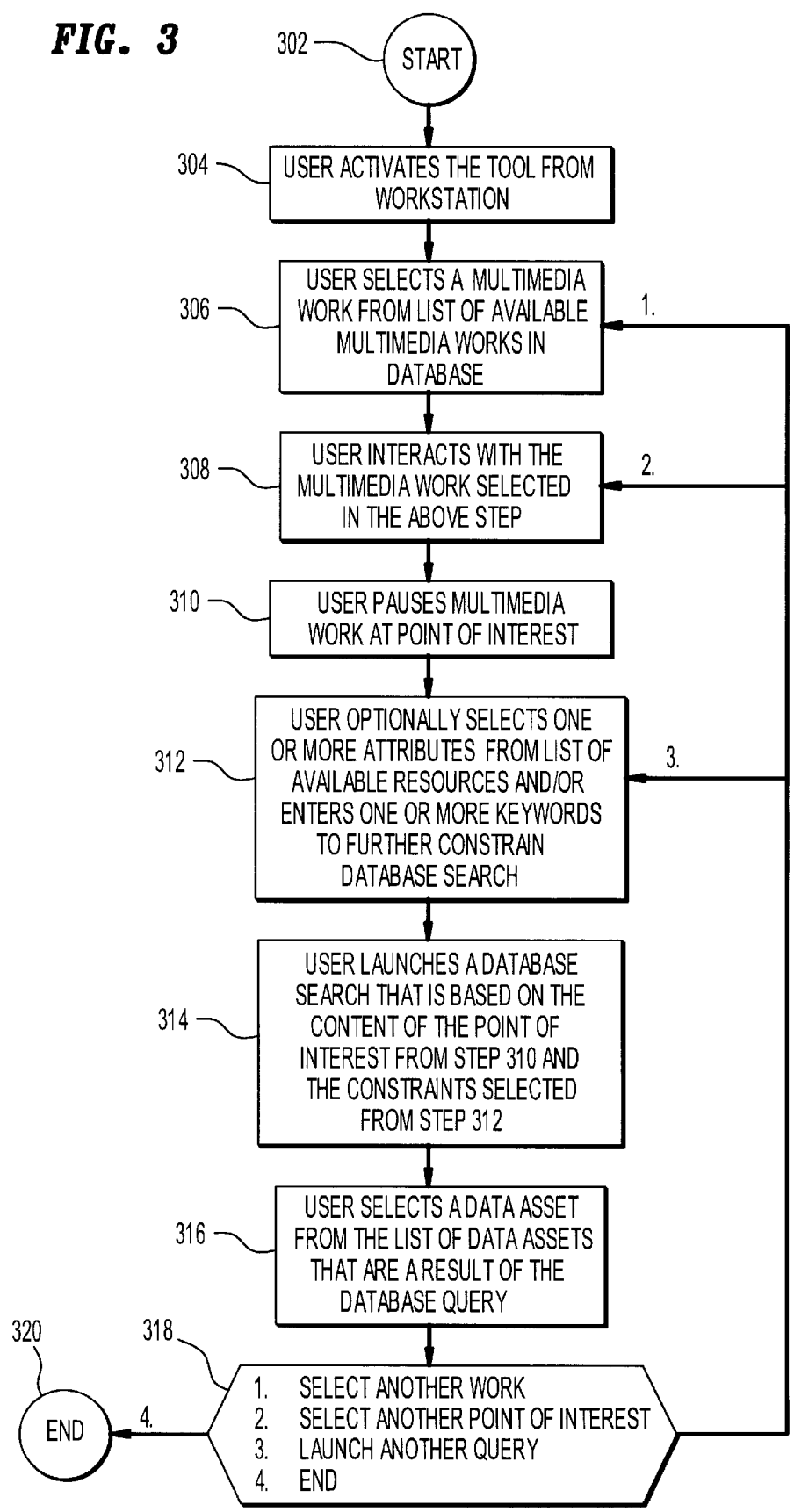
FIG. 3 is a flowchart depicting a process for using the present invention.

A process for using a preferred embodiment of the present invention will now be described with reference to the flowchart in FIG. 3. The process begins with step 302 and immediately proceeds to step 304. In step 304, the user activates the tool, such as the browser 200 on a workstation 102. In step 306 the user selects a multimedia work form a list of available multimedia works in the database 106. As stated this may be accomplished for example, by selecting a pull-down list from the film title window 224 or the like. Many additional methods can be used to present the user with a selectable list of available multimedia works.

In step 308 the user interacts with the multimedia work. Again there are many ways to accomplish this task. In the case of a film or video type multimedia work, user interaction occurs by viewing the multimedia work. This can be accomplished for example, via controls such as the VCR-type controls in the control window 220, the movie scroll bar 218, or by specifying a particular scene and/or sequence number in the scene and/or sequence windows 212 and 210, respectively.

In the case of an interactive video game or the like, user interaction is typically accomplished by playing the game using standard game controls, such as a joystick, mouse, game pad, steering wheel or the like. In addition, the user may interact with a video game by specifying a particular portion of the game that is of interest, which causes the game program to jump to and execute a different part of the program's code. Specific implementations of such user interaction will be apparent to those skilled in the relevant art(s).

In step 310, the user pauses the multimedia work at a point of interest. As stated, this is typically accomplished by providing a stop or pause button, such as the stop button depicted in the control window 220. In step 312, the user optionally selects one or more attributes form the list of available resources and/or enters keywords to further constrain the search. For example, the user may select one or more of the icons from the icon bars 204 and 206 to constrain the search to data assets 110 having the selected attributes. As stated, this step is optional. If no attributes are selected the database query searches all of the available data assets 110. Additionally, the user has the option to enter keywords, for example in the keyword entry field 208 as described above.

In step 314, the user launches a database search that is based on the content of the point of interest selected in step 310 and the additional constraints selected in step 312. Typically this is accomplished by having the user select a search button, such as the search button 214.

In step 316, the user selects a multimedia data asset from the list of multimedia data assets which are the result of the database search. As stated, the user may be provided with information about the selected data asset or have the option to view and/or check-out the selected data asset.

In step 318, the user has the option to select another work, select another point of interest, launch another query or end the process. If the user wishes to select another work, control passes to step 306, where the user selects another multimedia works from the list of available multimedia works. If the user wishes to select another point of interest, control passes to step 308 where the user interacts with the currently selected multimedia work. If the user wishes to launch another query based on the selected point of interest, the control passes to step 312 where the user can select different attributes and/or enter keywords to constrain the search. If the user wishes to end the program, control passes to step 320 where the process ends.

Figure 4:
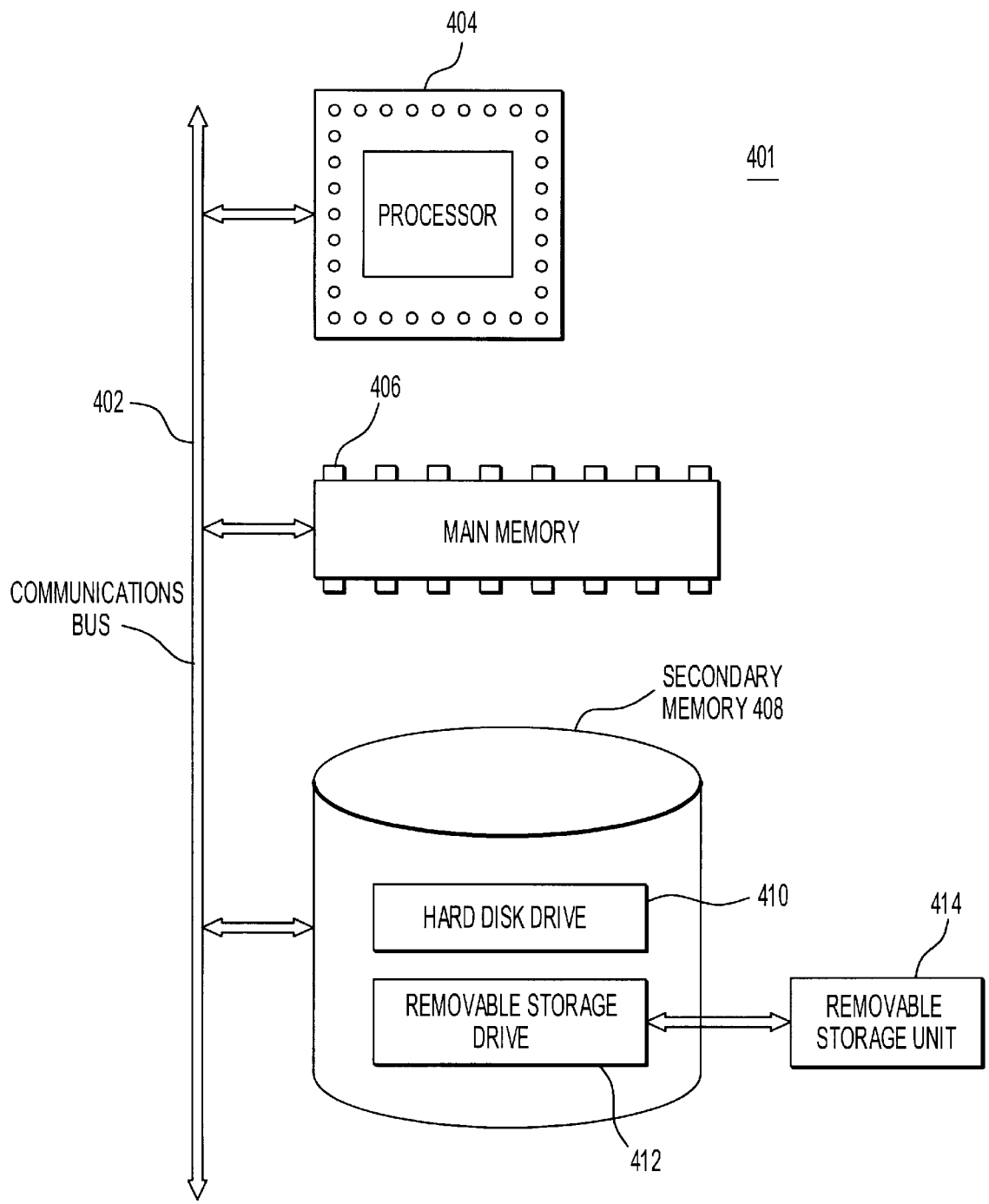
FIG. 4 is a block diagram of a computer system useful for implementing components of the present invention.

In one embodiment, the present invention may be embodied in a general computer system. An exemplary computer system 401 is shown in FIG. 4. The computer system 401 includes one or more processors, such as processor 404. The processor 404 is connected to a communication bus 402.

The computer system 401 also includes main memory 406, preferably random access memory (RAM), and a secondary memory 408. The secondary memory 408 includes, for example, a hard disk drive 410 and/or a removable storage drive 412, representing a floppy disk drive, a magnetic tape drive, a compact disk drive, etc. The removable storage drive 412 reads from and/or writes to a removable storage unit 414 in a well known manner.

Removable storage unit 414, also called a program storage device or a computer program product, represents a floppy disk, magnetic tape, compact disk, etc. As will be appreciated, the removable storage unit 414 includes a computer usable storage medium having stored therein computer software and/or data.

Computer programs (also called controllers) are stored in main memory and/or the secondary memory 408. Such computer programs, when executed, enable the computer system 401 to perform the features of the present invention discussed herein. In particular, the computer programs, when executed enable the processor 404 to perform the features of the present invention. Accordingly, such computer programs represent controllers of the computer system 401.

In another embodiment, the invention is directed to a computer program product comprising a computer readable medium having control logic (computer software) stored therein. The control logic, when executed by processor 404, causes the processor 404 to perform the functions of the invention as described herein.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method for automatically constructing a database query for data elements associated with a multimedia work, the method comprising the steps of:

(1) selecting the multimedia work from a list of available multimedia works;

(2) starting the selected multimedia work;

(3) pausing the selected multimedia work at a particular point of interest, and;

(4) automatically constructing a database query, wherein the database query is a function of and is constrained by the content of the particular point of interest.

2. The method of claim 1, further comprising the step of:

constraining the database query further by selecting at least one attribute from a list of available attributes that is being automatically generated based on available data components that are associated with the particular point of interest.

3. The method of claim 1, further comprising the step of launching the database query.

4. A method for automatically creating a database query for finding data elements, within a database, associated with a particular point of interest in a multimedia work, the method comprising the steps of:

(1) presenting to a user a list of available multimedia works from the database;

(2) accepting from the user a selected multimedia work from the list of available multimedia works;

(3) running the selected multimedia work;

(4) presenting the selected multimedia work to the user;

(5) providing means for the user to interact with the selected multimedia work;

(6) pausing the selected multimedia work at a particular point of interest upon input from the user; and (7) automatically creating a database query used to search for data elements associated with the content of the particular point of interest.

5. The method of claim 4, wherein step (4) includes playing the multimedia work on an output device.

6. The method of claim 4, wherein step (5) includes providing a control window used to manipulate the selected multimedia work.

7. The method of claim 4, wherein step (5) includes providing a scroll bar to change the current position of the selected multimedia work.

8. The method of claim 4, further comprising the step of accepting from the user a keyword used to further constrain said database query created in step (7).

9. The method of claim 4, further comprising the step of providing a list of data element attributes based on attributes of available data elements within the database associated with the current context of the selected multimedia work.

10. The method of claim 9 wherein said list of data element attributes are displayed by using icons, wherein icons representing available data elements are highlighted and icons representing unavailable data elements are un-highlighted.

11. The method of claim 9, wherein the list of data elements are presented to the user in real-time while the selected multimedia work is running.

12. The method of claim 9, further comprising the step of accepting from the user at least one attribute from said list of data element attributes, said at least one attribute being used to further constrain said database query created in step (6).

13. A computer program-product comprising a computer useable medium having computer program logic stored therein, said computer program logic for creating a database query for finding data elements, within a database, associated with particular point of interest in a multimedia works, wherein said computer program logic comprises:

means for enabling the computer to present to a user a list of available multimedia works from the database;

means for enabling the computer to accept from the user a selected multimedia work from said list of available multimedia works;

means for enabling the computer to run said selected multimedia work;

means for enabling the computer to present said selected multimedia work to the user;

means for enabling the computer to provide means for the user to interact with said selected multimedia work;

means for enabling the computer to pause said selected multimedia work at a particular point of interest upon input from the user; and means for enabling the computer to automatically create a database query used to search for data elements associated with the content of said particular point of interest.

14. The computer program-product of claim 13, wherein said presenting means includes means for enabling the computer to play said selected multimedia work on an output device.

15. The computer program-product of claim 13, wherein said providing means includes means for enabling the computer to provide a control window comprising movie control buttons.

16. The computer program-product of claim 13, wherein said providing means includes means for enabling the computer to provide a scroll bar to change the current position of said selected multimedia work.

17. The computer program-product of claim 13, further comprising means for enabling the computer to accept from the user a keyword used to further constrain said database query.

18. The computer program-product of claim 13, further comprising means for enabling the computer to provide a list of data element attributes based on the attributes of available data elements within the database that are associated with the current context of said selected multimedia work.

19. The computer program-product of claim 18 wherein said list of data element attributes are displayed by using icons, wherein icons representing available data elements are highlighted and icons representing unavailable data elements are un-highlighted.

20. The computer program-product of claim 18, wherein said list of data elements are presented to the user in real-time while said selected multimedia work is running.

21. The computer program-product of claim 18, further comprising means for enabling the computer to accept from the user at least one attribute from said list of data element attributes, said at least one attribute is used to further constrain said database query.

* * * * *